United States Patent
Slaughter

(10) Patent No.: US 7,810,552 B2
(45) Date of Patent: *Oct. 12, 2010

(54) METHOD OF MAKING A HEAT EXCHANGER

(75) Inventor: Victor Blakemore Slaughter, Manchester, MO (US)

(73) Assignee: The Boeing Company, Chicago, IL (US)

( * ) Notice: Subject to any disclaimer, the term of this patent is extended or adjusted under 35 U.S.C. 154(b) by 264 days.

This patent is subject to a terminal disclaimer.

(21) Appl. No.: 11/643,379

(22) Filed: Dec. 20, 2006

(65) Prior Publication Data

US 2008/0149313 A1    Jun. 26, 2008

(51) Int. Cl.
*F28D 1/00* (2006.01)

(52) U.S. Cl. ...................................... 165/148; 430/269

(58) Field of Classification Search ................ 165/148, 165/152, 153; 430/269; 700/120
See application file for complete search history.

(56) References Cited

U.S. PATENT DOCUMENTS

| | | | |
|---|---|---|---|
| 5,746,844 A | * | 5/1998 | Sterett et al. ................ 148/522 |
| 6,046,426 A | * | 4/2000 | Jeantette et al. ......... 219/121.63 |
| 6,112,804 A | | 9/2000 | Sachs et al. |
| 6,122,564 A | * | 9/2000 | Koch et al. .................. 700/123 |
| 6,391,251 B1 | | 5/2002 | Keicher et al. |
| 6,623,687 B1 | * | 9/2003 | Gervasi et al. .............. 264/401 |
| 6,751,516 B1 | * | 6/2004 | Richardson ................. 700/119 |
| 6,940,037 B1 | * | 9/2005 | Kovacevic et al. ...... 219/121.64 |
| 2004/0191106 A1 | * | 9/2004 | O'Neill et al. ................. 419/2 |
| 2005/0221150 A1 | * | 10/2005 | Revol .......................... 429/38 |

FOREIGN PATENT DOCUMENTS

WO    WO 2006/064202 A1    6/2006

OTHER PUBLICATIONS

Luo, et al, "Constructal approach and multi-scale components" Applied Thermal Engineering. 27 (2007) 1708-1714.

* cited by examiner

*Primary Examiner*—Teresa J Walberg

(57) ABSTRACT

In one embodiment, a method of making a heat exchanger is provided, comprising the steps of generating a stereolithography file from design data, slicing the stereolithography file into two-dimensional patterns, and depositing at least one layer of a material having a high thermal conductivity onto a top surface of a substrate to form a heat exchanger. Preferably, the heat exchanger does not require assembly of separate pieces to form the heat exchanger. In another embodiment a heat exchanger made by this embodiment of the method is provided wherein the heat exchanger may have a design comprising tapered fins and/or alternating airfoil cross-sections.

10 Claims, 1 Drawing Sheet

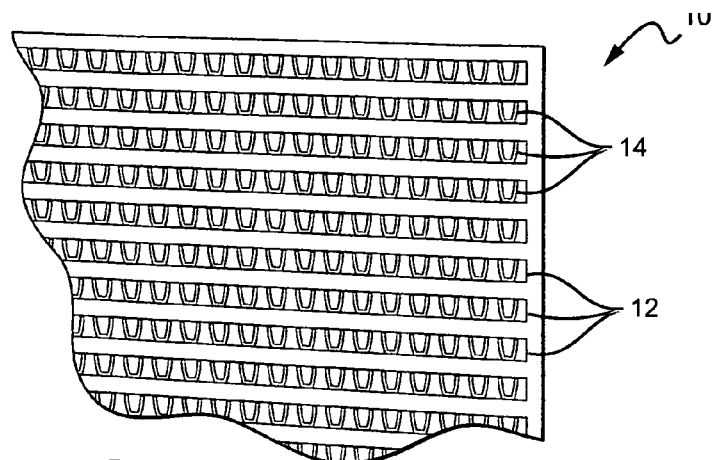
FIG. 1
PRIOR ART
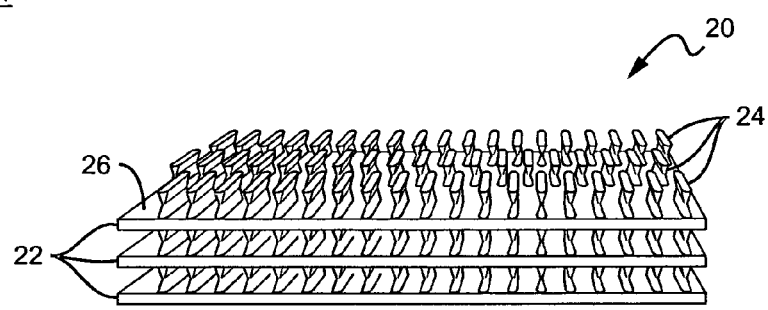
FIG. 2
FIG. 3
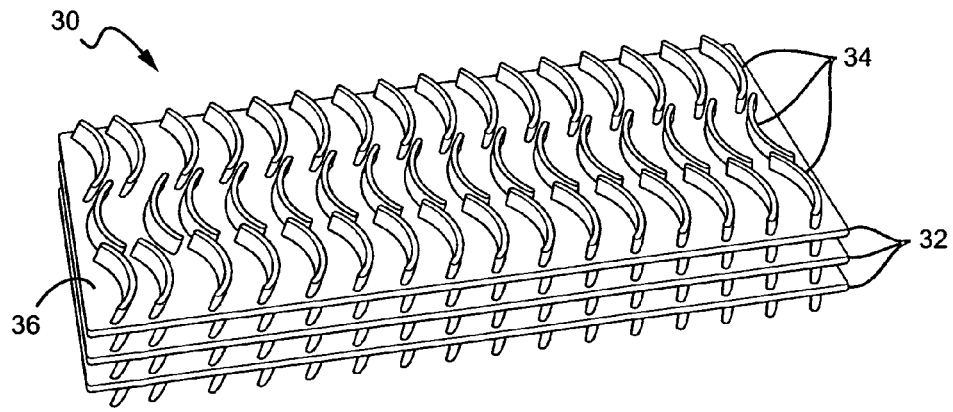

METHOD OF MAKING A HEAT EXCHANGER

BACKGROUND OF THE INVENTION

1) Field of the Invention

A method of making a heat exchanger is provided. More particularly, a method of making a compact heat exchanger by an additive process is provided.

2) Description of Related Art

Known heat exchangers are devices built for efficient heat transfer from one fluid to another, whether the fluids are separated by a solid wall so that they never mix, or the fluids are directly contacted. Heat exchangers are typically used in refrigeration, air conditioning, space heating, electricity generation, and chemical processing. Heat exchangers are of particular use in the aerospace and automobile industries. For efficiency, heat exchangers are designed to maximize the surface area of the wall between the two fluids, while minimizing resistance to fluid flow through the exchanger. The heat exchanger's performance can also be affected by the addition of fins or corrugations in one or both directions, which increase surface area and may channel fluid flow or induce turbulence. Optimized devices are known as compact heat exchangers. Compact heat exchangers are complex structures with delicate components. The nature of the compact heat exchanger drives the cost of manufacture and cost of quality to high levels. Known methods of manufacturing heat exchangers and compact heat exchangers involve complex assembly and difficult attachment, brazing, soldering, or welding operations of the various parts of the heat exchangers, including but not limited to, the core, the exterior, interfacing flanges, fins, and manifolds. Known heat exchangers are typically of a thin foil construction and require brazing or a similar process to connect the pieces together. Thus, the cost of manufacturing compact heat exchangers using known methods is high due to the complex assembly operations and maintenance of tools to conduct the assembly operations. Moreover, the efficiency of compact heat exchangers using known methods of manufacturing is low. Finally, the increased demands placed on modern electronic, laser, engine, and similar systems, places increased demands on the cooling systems, which support them, in the manufacturing of compact heat exchangers. Accordingly, there is a need for a method of making a heat exchanger that does not have the problems associated with known methods.

SUMMARY OF THE INVENTION

This need for a method of making a heat exchanger that does not have the problems associated with known methods, as well as a unique, nonobvious, and advantageous method, is satisfied. None of the known methods provides all of the numerous advantages discussed herein. Unlike known methods, an embodiment of the method of making a heat exchanger may provide one or more of the following advantages: reduced manufacturing cost and improved efficiency; applies additive manufacturing techniques to grow heat exchangers and compact heat exchangers; the use of additive manufacturing provides that increased complexity of components does not add to manufacturing costs; the use of an additive process enables the use of more complex geometries in the exchanger assembly when needed; the fabrication process will grow the heat exchanger or compact heat exchanger in one piece, complete with core, exterior, interfacing flanges, fins, and manifolds; eliminates assembly operations and maintenance of tools; and, provides the ability to manufacture complex monolithic structures as an alternative to brazing intense assemblies.

In one embodiment, there is provided a method of making a heat exchanger, the method comprising the steps of: generating a stereolithography file from design data; slicing the stereolithography file into two-dimensional patterns; and, depositing at least one layer of a material having a high thermal conductivity onto a top surface of a substrate to form a heat exchanger. In another embodiment, there is provided a heat exchanger made by this embodiment of the method, wherein the heat exchanger may have a design comprising tapered fins and/or alternating airfoil cross-sections.

In another embodiment, there is provided a method of making a heat exchanger, the method comprising the steps of: generating a stereolithography file from design data; slicing the stereolithography file into two-dimensional patterns; depositing at least one layer of a material having a high thermal conductivity onto a top surface of a substrate to form a heat exchanger; and, repeating the depositing step for each of a plurality of additional high thermal conductivity material layers.

BRIEF DESCRIPTION OF THE DRAWINGS

The foregoing and other advantages and features, and the manner in which the same are accomplished, will become more readily apparent upon consideration of the following detailed description taken in conjunction with the accompanying drawings which illustrate preferred and exemplary embodiments, but which are not necessarily drawn to scale, wherein:

FIG. 1 is a front view of a prior art compact heat exchanger;

FIG. 2 is a perspective view of an embodiment of a compact heat exchanger with tapered fins made from an embodiment of the method of the invention; and, FIG. 3 is a perspective view of another embodiment of a compact heat exchanger with alternating airfoil cross-sections made from an embodiment of the method of the invention.

DETAILED DESCRIPTION OF THE INVENTION

Embodiments of the invention now will be described more fully hereinafter with reference to the accompanying drawings, in which some, but not all embodiments of the invention are shown. Indeed, several different embodiments may be provided and should not be construed as limited to the embodiments set forth herein. Rather, these embodiments are provided so that this disclosure will be thorough and complete and will fully convey the scope of the invention to those skilled in the art. Like numbers refer to like elements throughout.

Referring now to the drawings, FIG. 1 is a front view of a prior art compact heat exchanger 10 formed with a series of stacked plates 12. Each plate 12 has a plurality of rows of fins 14 connected to each plate 12. FIG. 2 is a perspective view of an embodiment of a compact heat exchanger 20 made from an embodiment of the method of the invention. The compact heat exchanger 20 is formed with a series of stacked plates 22. Each plate has a plurality of rows of tapered fins 24 adjacent to a surface 26 of each plate 22. These tapered fins comprise the core or interior portion of the heat exchanger and are positioned in the interior portion of the heat exchanger. With the core design of the heat exchanger or compact heat exchanger, it is preferred to have a high surface area and a good flow rate. The tapered fin design provides a high surface area and good flow rate and is a more efficient design than a typical fin design such as shown in FIG. 1. FIG. 3 is a perspective view of another embodiment of a compact heat exchanger 30 made from an embodiment of the method of the invention. The compact heat exchanger 30 is formed with a series of stacked plates 32. Each plate has a plurality of rows of alternating airfoil cross-sections 34 adjacent to a surface 36 of each plate 32. These alternating airfoil cross-sections comprise the core or interior portion of the heat exchanger and are positioned in the interior portion of the heat exchanger. With the core design of the heat exchanger or compact heat exchanger, it is preferred to have a high surface area and a good flow rate. The alternating airfoil cross-section design provides a high surface area and good flow rate and is a more efficient design than a typical fin design such as shown in FIG. 1. Although compact heat exchangers in FIGS. 2 and 3 are shown with tapered fins and alternating airfoil cross-sections, respectively, other fin designs may also be formed.

In one embodiment of the method there is provided a method of making a heat exchanger. The embodiment of the method may be used to make a heat exchanger or a compact heat exchanger. Preferably, the embodiment of the method of making the heat exchanger is by an additive process, such as an additive deposition process or a metallic additive process. Preferably, the additive deposition process is a shape metal deposition process that may use an electron beam gun or a laser and a powdered metal, metal alloy, or composite material. However, other suitable additive processes may be used. Preferably, the heat exchanger or compact heat exchanger formed is a plate heat exchanger composed of multiple, thin, slightly-separated plates that have large surface areas and fluid flow passages for heat transfer.

An embodiment of the method comprises the step of generating a stereolithography file from design data such as computer aided design (CAD). The embodiment of the method further comprises the step of slicing the stereolithography file into two-dimensional patterns. The method of this embodiment may further comprise the step of heating with a heating component to a first temperature a substrate having a top surface and a bottom surface. Preferably, the heating component used to heat the substrate is an electron beam gun. However, the heating component may also comprise a laser or another suitable heating component. Preferably, the substrate or start plate is a metal or metal alloy substrate surface or start plate made of titanium, aluminum, vanadium, cobalt, chromium, copper, nickel, tungsten, or another suitable metal or metal alloy. Preferably, the thickness of the substrate may be between about one-quarter inch to about two inches. However, other suitable thicknesses may also be used. Preferably, the depth and width of the substrate are both less than eight inches. However, typically, the size and dimension of the substrate is dependent on the predetermined heat exchanger to be grown and obtained. The substrate and/or part are first designed in a three-dimensional CAD (computer aided design) program. The program file is then transferred to a pre-processing software where the model is sliced into thin layers. Preferably, the pre-processing software used is a software such as Magics RP obtained from Materialise of Belgium. Preferably, the substrate is heated to a first temperature in the range of about 650 degrees Celsius to about 750 degrees Celsius. However, the heat of the first temperature may be dependent on the material being deposited, and another suitable first temperature may be used.

The embodiment of the method further comprises the step of depositing at least one layer of a material having a high thermal conductivity onto a top surface of a substrate to form a heat exchanger. Preferably, the heat exchanger is formed in a single piece and does not require assembly of separate pieces to form the heat exchanger. Preferably, the high thermal conductivity material is a metal or metal alloy or composite, such as carbon, titanium, aluminum, vanadium, cobalt, chromium, copper, nickel, and/or tungsten. However, other suitable high thermal conductivity materials may also be used. Preferably, the material has a thermal conductivity that is appropriate for the environmental and temperature conditions used in the embodiment of the method. Preferably, the thickness of the material layer deposited onto the substrate is in a range of about 0.001 inches thick to about 0.004 inches thick. Preferably, the depositing step may further comprise depositing at least one layer of a material having a high thermal conductivity onto a two-dimensional pattern representing a section of a three-dimensional component on the top surface of the substrate. In this embodiment of the method, the preferred deposition machine used is one such as the Arcam machine, model number EBM S12 system, obtained from Arcam AB of Sweden. However, other conventional deposition machines may also be used. The Arcam machine provides a free form fabrication technology for direct manufacturing of fully dense parts made of metal powder. The free form technology is based on electron beam melting, and parts are manufactured by melting metal powder and building up the parts layer by layer. Preferably, the material is a metal or metal alloy or composite such as carbon, titanium, aluminum, vanadium, cobalt, chromium, copper, nickel, and/or tungsten. More preferably, the material used is titanium 6Al4V 6 Aluminum 4 Vanadium. The material is uniformly deposited onto the substrate with a rake-like device that is part of the Arcam machine.

The embodiment of the method may further comprise the step of melting the high thermal conductivity material layer at a second temperature with a heating component to grow the heat exchanger or compact heat exchanger. Preferably, the heating component used to melt the high thermal conductivity material is the same electron beam gun that is used to heat the substrate. However, the heating component may also comprise a laser or another suitable heating component. The electron beam gun may be a part of the Arcam machine. The electron beam gun is preferably used in a vacuum chamber which provides a high power process and a good environment, resulting in superior material characteristics. A vacuum chamber is preferred so that the electrons have a clear path to the metal. Further, the vacuum provides a good thermal environment, leading to good form stability and controlled thermal balance in the part. Preferably, the vacuum chamber or build chamber is about 250 millimeters long, by 250 millimeters wide, by 250 millimeters high. However, the vacuum chamber may also be larger in size. Preferably, the second temperature is greater than 2000 degrees Celsius and is at a heat suitable for melting the metal or metal alloy layer.

The heat exchanger or compact heat exchanger formed from the embodiment of the method does not require assembly of separate pieces to form the heat exchanger or compact heat exchanger. In manufacturing conventional heat exchangers, the assembly of separate pieces typically comprises the processes of brazing, soldering, or welding the separate pieces together, and these types of assembly processes are not necessary to form the heat exchanger or compact heat exchanger of the embodiment of the method. A single piece or single unit heat exchanger or compact heat exchanger is easier to build or grow, less costly to manufacture, and more efficient than conventional methods of building heat exchangers.

The embodiment of the method may further comprise the step, after the depositing step, of repeating the depositing step for each of a plurality of additional high thermal conductivity material layers. The embodiment of the method may further comprise the step, after the depositing step, of repeating the melting step for each of a plurality of additional high thermal conductivity material layers. The embodiment of the method is repeated until the component is complete. The embodiment of the method may further comprise the step, after a final depositing step, of cooling the heat exchanger if heat is used with the embodiment of the method. The formed heat exchanger or compact heat exchanger may be cooled with helium, argon, or another suitable cooling agent for an effective period of time. Preferably, the time to complete the steps of the method for making a one-layer compact heat exchanger is less than several minutes. However, the time to make the heat exchanger or compact heat exchanger depends on the size of the heat exchanger or compact heat exchanger desired. The larger the heat exchanger or compact heat exchanger desired, the longer the time to make the heat exchanger or compact heat exchanger. The smaller the heat exchanger or compact heat exchanger, the shorter the time to make the heat exchanger or compact heat exchanger. Preferably, the heat exchanger or compact heat exchanger formed by the embodiment of the method comprises a core, an exterior, interfacing flanges, fins, and manifolds. With the embodiment of the method there is no separate assembly required to connect the core to the exterior of the heat exchanger. In addition, with the embodiment of the method, there is no separate assembly required to connect the manifolds to the exterior of the heat exchanger. Thus, there is no concern that the core to the exterior connection or the manifolds to the exterior connection will come apart. Preferably, the heat exchanger or compact heat exchanger formed has an acceptable surface roughness and resolution. The finer the layer of material, the better the surface resolution of the heat exchanger or compact heat exchanger formed. The heat exchanger or compact heat exchanger may be finished upon completion of the build.

In another embodiment there is provided a heat exchanger or compact heat exchanger made by the embodiment of the method discussed above, wherein the heat exchanger or compact heat exchanger may have a design comprising tapered fins 24 (see FIG. 2) and/or alternating airfoil cross-sections 34 (see FIG. 3). Preferably, the heat exchanger or compact heat exchanger may have a design with a minimal surface and/or a minimal skeleton. Preferably, the heat exchanger or compact heat exchanger formed is a structure with a low density and high surface to volume ratio.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed that modifications and other embodiments are intended to be included within the scope of the appended claims. Although specific terms are employed herein, they are used in a generic and descriptive sense only and not for purposes of limitation.

What is claimed is:

1. A method of making a single piece heat exchanger using additive free form fabrication, the method, comprising the steps of:
   generating a stereolithography file from design data;
   slicing the stereolithography file into two-dimensional patterns;
   heating a substrate;
   forming a single piece, complete heat exchanger that does not require assembly of separate pieces, by depositing via electron beam additive deposition a plurality of layers of a material having a high thermal conductivity onto a top surface of the substrate, and forming a series of stacked plates each having a plurality of rows of tapered fins, forming a core interior portion, forming manifolds, and forming interfacing flanges for connecting the heat exchanger to an exterior housing; and,
   cooling the single piece heat exchanger with a cooling agent after all of the plurality of layers have been deposited and the single piece heat exchanger has been formed.

2. The method of claim 1 comprising the further step, after the depositing and forming of each of the plurality of layers, of melting each of the plurality of layers of high thermal conductivity material with an electron beam gun.

3. The method of claim 1 wherein the material is selected from the group consisting essentially of carbon, titanium, aluminum, vanadium, cobalt, chromium, copper, nickel, and tungsten.

4. The method of claim 1 wherein the thickness of each of the plurality of material layers deposited onto the substrate is in a range of about 0.001 inches to about 0.004 inches.

5. The method of claim 1 wherein the heat exchanger is a compact heat exchanger.

6. The method of claim 1 wherein the cooling agent is selected from the group consisting of helium and argon.

7. A method of making a single piece heat exchanger using additive free form fabrication, the method comprising the steps of:
   generating a stereolithography file from design data;
   slicing the stereolithography file into two-dimensional patterns;
   heating a substrate;
   forming a single piece, complete heat exchanger that does not require assembly of separate pieces, by depositing via electron beam additive deposition a plurality of layers of a material having a high thermal conductivity onto a top surface of the substrate, and forming a series of stacked plates each having a plurality of rows of tapered fins, forming a core interior portion, forming manifolds, and forming interfacing flanges for connecting the heat exchanger to an exterior housing;
   melting each of the plurality of layers of high thermal conductivity material with the electron beam gun; and,
   cooling the single piece heat exchanger with a cooling agent after all of the plurality of layers have been deposited and melted, and the single piece heat exchanger has been formed.

8. The method of claim 7 wherein the material is selected from the group consisting essentially of carbon, titanium, aluminum, vanadium, cobalt, chromium, copper, nickel, and tungsten.

9. The method of claim 7 wherein no separate assembly is required to connect the core to the exterior of the heat exchanger.

10. The method of claim 7 wherein no separate assembly is required to connect the manifolds to the exterior of the heat exchanger.

* * * * *